United States Patent [19]

Dixon et al.

[11] 4,303,759

[45] Dec. 1, 1981

[54] POLYALKYLENECARBONATE COMPOSITIONS WITH IMPROVED THERMAL STABILITY AND METHOD FOR MAKING SAME

[75] Inventors: Dale D. Dixon, Kutztown; Michael E. Ford, Trexlertown, both of Pa.

[73] Assignee: Air Products and Chemicals, Inc., Allentown, Pa.

[21] Appl. No.: 186,935

[22] Filed: Sep. 12, 1980

[51] Int. Cl.³ .................... C08L 69/00; C08K 5/42
[52] U.S. Cl. .................... 525/3; 260/45.75; 525/523
[58] Field of Search .................... 525/408, 523, 3; 528/370; 260/45.7 S

[56] References Cited

U.S. PATENT DOCUMENTS

| 3,177,179 | 4/1965 | Lee et al. | 528/196 |
| 3,585,168 | 6/1971 | Inoue et al. | 260/77.5 D |
| 3,900,424 | 8/1975 | Inoue et al. | 252/428 |
| 3,953,383 | 4/1976 | Inoue et al. | 260/2 BP |
| 4,032,510 | 6/1977 | Floyd et al. | 260/45.85 S |
| 4,066,630 | 1/1978 | Dixon et al. | 260/77.5 D |
| 4,104,264 | 8/1978 | Dixon et al. | 528/370 |
| 4,145,524 | 3/1979 | Frosch et al. | 528/401 |
| 4,145,525 | 3/1979 | Dixon et al. | 528/404 |

*Primary Examiner*—Theodore E. Pertilla
*Attorney, Agent, or Firm*—William F. Marsh; Paul F. Prestia; E. Eugene Innis

[57] ABSTRACT

Polyalkylene carbonates are stabilized against oxidative degradation by the inclusion therein of 0.2–10%, preferably 1–5%, of peroxyl-reactive sulphur-containing additive. Such compounds, found to be effective, are 3-t-butyl-4-hydroxy-5-methylphenyl sulfide, diphenyl sulfide, diphenyl sulfoxide, diphenyl sulfone, di-(p-tolyl sulfide) and sulphur.

19 Claims, No Drawings

POLYALKYLENECARBONATE COMPOSITIONS WITH IMPROVED THERMAL STABILITY AND METHOD FOR MAKING SAME

TECHNICAL FIELD

This invention pertains to polyalkylenecarbonate compositions, stabilized against thermal degradation, and to methods for forming such stabilized compositions.

BACKGROUND OF PRIOR ART

Polyalkylenecarbonate compositions stabilized against thermal degradation by thermolytic reactions with terminal hydroxyl positions, by end-capping or reaction of terminal hydroxyl, are disclosed and claimed in U.S. Pat. Nos. 4,066,630, 4,104,264 and 4,145,525, of common assignment herewith. The '264 patent, in particular, discloses such end-capped polyalkylenecarbonates stabilized by reacting the free terminal hydroxyl groups thereon with a hydroxyl reactive sulphur compound, among which are included, disulfides, such as dimethyl and diphenyl disulfide. In general the other sulphur compounds therein recited are sulfonyls and sulfinyls. According to the '264 patent, these sulphur compounds are reacted in an amount at least 20% in excess of the stoichiometric amount required to react with the terminal hydroxyl groups of the polyalkylenecarbonate (Column 3, lines 54–56). Residual reactant is, however, considered undesirable in any polymeric composition. Therefore, in the '264 patent process this reactant is removed, such as by extraction in a methanol precipitate (Column 4, lines 44–46).

The end-cap stabilized compositions of the aforementioned patents, as well as the stabilized composition and method of the present invention, are based upon polyalkylenecarbonates generally of the type prepared according to U.S. Pat. Nos. 3,585,168, 3,900,424 or 3,953,383. Such compositions are to be distinguished from polyarylenecarbonates, as to which thermal stabilization with antioxidant additives, especially including organophosphorous compounds, is well known.

Other resin antioxidant stabilizers are shown, in U.S. Pat. No. 4,032,510—Floyd et al, in which it is disclosed that resins, such as polyolefins, and most particularly these polymerized from alpha-olefins using a Ziegler-type polymerization catalyst, may be stabilized not only by phenolic additives but by reacted phenolics, particularly including end-reacted bisphenol sulfides. Extention of this teaching to polyalkylenecarbonates is not suggested, however.

BRIEF SUMMARY OF THE INVENTION

In accordance with the present invention, polyakylenecarbonates of the type prepared, according to U.S. Pat. Nos. 3,585,168, 3,900,424 or 3,953,383 are stabilized for improved resistance to thermal degradation by the combination therewith of 0.2–10% by wt. (based on the weight of the polycarbonates to be stabilized), and preferably 1–5%, of peroxyl-reactive sulphur-containing compounds. The term "peroxyl-reactive sulfur-containing compound" (sometimes abbreviated as "PRSC)", refers to an additive compound characterized by a capacity to decompose or degrade a peroxyl or hydroperoxyl substituent on a polyalkylenecarbonate polymer chain. This stabilization method and the resultant composition encompasses polyalkylenecarbonates generally, as well as end-capped polycarbonates formed in accordance with the teachings of U.S. Pat. Nos. 4,032,510, 4,104,264 and 4,145,524. The peroxyl-reactive compounds specifically identified to be effective are 3-t-butyl-4-hydroxy-5-methylphenyl sulfide, diphenyl sulfide, diphenyl sulfoxide, diphenyl sulfone, di-(p-tolyl sulfide) and sulphur.

The polyalkylenecarbonates to which this invention is addressed are characterized as normally solid compositions having substantially alternating epoxide and carbon dioxide units and a plurality of free hydroxyl groups represented by the formula:

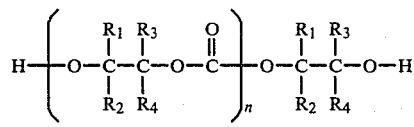

wherein
$R_1$ is hydrogen, a halomethyl group, or a hydrocarbyl group having from 1 to 6 carbon atoms;
$R_3$ is hydrogen, a halomethy group, or a hydrocarbyl group having from 1 to 6 carbon atoms;
$R_2$ and $R_4$ are hydrogen or a hydrocarbyl group having from 1 to 6 carbon atoms; or
$R_1$, $R_2$, $R_3$ and $R_4$ are combined together constituting a carbocyclic ring of from 4 to 7 carbon atoms,
n is the number of repeating units, which range from about 250 to 6,500, and preferably from 500 to 1,500,
and end-capped modifications thereof.

DETAILED DESCRIPTION OF THE INVENTION

Thermal degradation of polyalkylenecarbonates generally occurs through thermolytic reactions with terminal hydroxyl groups. The prior art end-capping of polyalkylenecarbonates to effect thermal stabilization thereof tends to arrest this form of degradation by reacting and blocking only these terminal hydroxyl groups.

At elevated temperatures, however, thermally-induced chain cleavage of the polycarbonate produces new terminal hydroxyl groups so that even with end-capped thermally stabilized polycarbonate, thermal degradation can be a problem at elevated temperatures. Such degradation, caused primarily by reaction of ambient oxygen, normally leads through a peroxyl-,hydroperoxyl-substituted stage to chain end hydroxyl and/or carbonyl functionality on the polycarbonate backbone. The ultimate formation of hydroxyl or carbonyl functionality on the polycarbonate backbone tends to be a stabilizing influence in that it blocks further chain unzipping. However, the peroxyl-hydroperoxyl radical-substituted intermediate may also be thermolyzed to alkoxy and hydroxy radicals which may initiate, propagate or transfer a radical chain reaction leading to ultimate degradation of the polymer chain and to its cyclic monomers.

By way of illustration of the foregoing, polyalkylene carbonates of the type of interest here have been shown to exhibit significantly greater stability at elevated temperatures under air vs. nitrogen atmospheres (see Table 1).

TABLE 1

Thermal Stability of Polyethylene And Polypropylene Carbonates (PEC and PPC) In Air And Nitrogen A. At 150 → 350° C.

|  | 10% wt loss (°C.) | 20% wt loss (°C.) | 30% wt loss (°C.) |
| --- | --- | --- | --- |
| PEC ($N_2$) | 195 | 197 | 198 |
| PEC (Air) | 225 | 230 | 233 |
| PPC ($N_2$) | 208 | 211 | 213 |
| PPC (Air) | 220 | 227 | 233 |

B. At 180° C.

|  | 10% wt loss (hr) | 20% wt loss (hr) | 30% wt loss (hr) |
| --- | --- | --- | --- |
| PEC ($N_2$) | 0.50 | 0.65 | 0.75 |
| PEC (Air) | 1.70 | 2.85 | 3.80 |
| PPC ($N_2$) | 0.55 | 0.75 | 1.00 |
| PPC (Air) | 1.30 | 2.80 | 4.20 |

This is attributed to the oxidation of the polyalkylene carbonate chain by ambient oxygen. Peroxyl and hydroperoxyl, and ultimately hydroxyl and/or carbonyl functionality, are introduced onto the polycarbonate backbone by reaction with oxygen (see Equation 1).

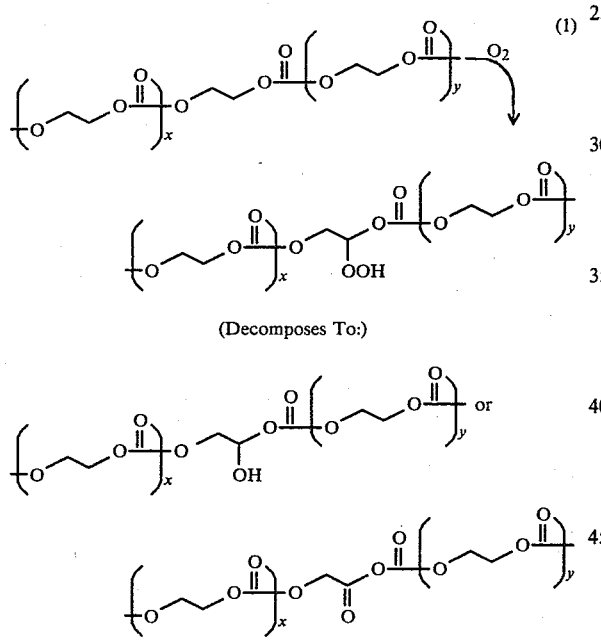

(1)

(Decomposes To:)

Presence of these additional substituents on the polymer chain interfers with thermal depolymerization of the polycarbonate to the cyclic carbonate monomer by blocking the chain-unzipping process (Equation 2).

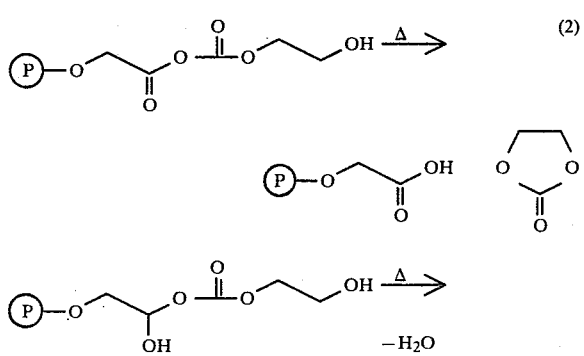

(2)

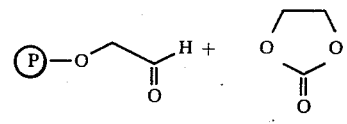

Both of these products (in equation (2)) lack the terminal alcohol OH groups necessary for thermal depolymerization.

However, the initial product of oxidation, the hydroperoxyl-substituted polymer, in the molecular structure shown, is unstable with respect to thermolysis of the hydroperoxyl or peroxyl group to alkoxy and hydroxy radicals (Equation 3).

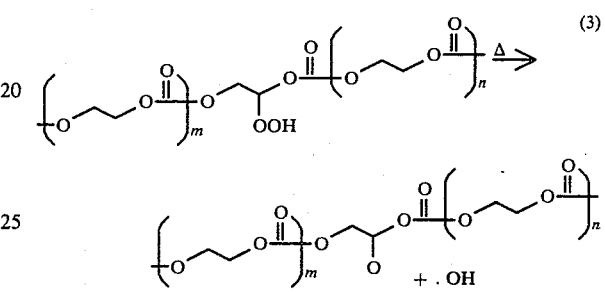

(3)

These intermediate radicals may either initiate, propagate, or transfer a radical chain reaction. Such chain processes ultimately lead to degradation of the polymer chain, and thus to deterioration of polymer properties.

Thermal stability of polyalkylene carbonate is therefore enhanced by incorporation of additives which permit oxidation of the polyalkylene carbonate backbone by oxygen, but which convert the initial unstable oxidation products (hydroperoxyl-, peroxyl-substituted polymers) to stable groups (alcohols and carbonyls) prior to intervention of radical decomposition.

Specifically, treatment of polyalkylene carbonates with sulphur-based preventive antioxidants, in conjunction with a short heat cure to functionalize the polycarbonate backbone, has been found to improve significantly the therml stability of polyalkylene carbonates, including end capped polyalkylene carbonates (Example 8, below) in oxygen-containing atmospheres (Table 2 below) and in non-oxygen atmospheres (Examples 3A, 5A and 6A, Table 2).

TABLE 2

Thermal Stabilization of PRSC Compound- Containing Polyalkylene Carbonates As Compared To PEC And PPC; Compositions in Examples below, identified by reference thereto).

A. At 150 → 350° C./Air

|  | 10% wt loss (°C.) | 20% wt loss (°C.) | 30% wt loss (°C.) |
| --- | --- | --- | --- |
| PEC | 225 | 230 | 233 |
| Ex. 1 | 243 | 254 | 258 |
| Ex. 2 | 240 | 248 | 253 |
| Ex. 3 | 241 | 252 | 258 |
| Ex. 3A(same as 3,$N_2$atmos) | 208 | 212 | 213 |
| Ex. 4 | 238 | 247 | 252 |
| Ex. 5 | 245 | 257 | 266 |
| Ex. 5A(same as 5,$N_2$atmos) | 215 | 220 | 221 |
| Ex. 6 | 240 | 247 | 252 |
| Ex. 6A(same as 6,$N_2$atmos) | 196 | 203 | 208 |
| PPC | 220 | 227 | 233 |
| Ex. 7 | 251 | 258 | 263 |

TABLE 2-continued

Thermal Stabilization of PRSC Compound- Containing Polyalkylene Carbonates As Compared To PEC And PPC; Compositions in Examples below, identified by reference thereto).

| | | | |
|---|---|---|---|
| Ex. 8 | 257 | 264 | 268 |
| Ex. 8A(same as 8, no additive) | 245 | 253 | 268 |

B. At 180° C./AIR

| | 10% wt loss (hr) | 20% wt loss (hr) | 30% wt loss (hr) |
|---|---|---|---|
| PEC | 1.70 | 2.85 | 3.80 |
| Ex. 1 | 5.00 | >5.00 | >5.00 |
| PPC | 1.30 | 2.80 | 4.20 |
| Ex. | >5.00 | >5.00 | >5.00 |

The foregoing examples are based on compositions containing approximately 5%, by weight, PRSC compound based on polyalkylene carbonate, and produced as follows. The resultant mixture, in each case as described below, is heat cured by heating from room temperature to 150° C. over a 15 to 20 minute period, following drying.

Examples 1–5; To a solution of polyethylene carbonate (2 gm) in chloroform (50 ml) was added, (Example 1) 100 mg 3-t-butyl-4-hydroxy-5-methylphenyl sulfide; (Example 2) 100 mg diphenyl sulfide; (Example 3) 100 mg diphenyl sulfoxide; (Example 4) 100 mg diphenyl sulfone; and (Example 5) 100 mg di-(p-tolyl sulfide). The resulting solutions were evaporated to dryness in vacuum at ambient temperature. Thermal stability was evaluated by TGA analysis, with the results obtained and shown in Table 2 and a comparison there made to unstabilized polyethylene carbonate.

Example 6; To a solution of polyethylene carbonate (2 gm) in chloroform (50 ml) was added 100 mg of finely powdered sulphur. The resulting suspension was evaporated to dryness with stirring in vacuum at ambient temperature. Thermal stability was evaluated by TGA analysis; see Table 2 for results obtained and comparison of these to unstabilized polyethylene carbonate.

Example 7; To a solution of polypropylene carbonate (2 gm) in chloroform (50 ml) was added 100 mg 3-t-butyl-4-hydroxy-5-methylphenyl sulfide. The resulting solution was evaporated to dryness in vacuum at ambient temperature. Thermal stability was evaluated by TGA analysis; see Table 2 for results obtained, and comparison of these to unstabilized polypropylene carbonate.

Examples 8–8A demonstrate the effectiveness of a PRSC compound additive in accordance with the present invention in end cap stabilized compositions. Specifically, a composition of polyethylene carbonate endcapped with methylisocyanate. Example 8A, a comparative example was compared, as shown in Table 2, with a similar composition to which was added 5% 3-t-butyl-4-hydroxy-5-methylphenyl sulfide (Example 8).

As illustrated in the foregoing, polyalkylene carbonates and particularly polyethylene and polypropylene carbonates, may be stabilized in accordance with the present invention by the addition thereto of sulphur-containing peroxyl reactive additive compounds, which interrupt the free radical decomposition route of the polycarbonate. The additive may be incorporated generally in a proportion to about 0.2 to 10% by wt. (based on the weight of polycarbonate to be stabilized), although the preferred level of incorporation is about 1–5 weight percent.

The PRSC Compound additives specifically known to be effective include 3-t-butyl-4-hydroxy-5-methylphenyl sulfide, diphenyl sulfide, diphenyl sulfoxide, diphenyl sulfone, di-(p-tolyl sulfide), and sulphur. In general, stabilizers anticipated to be within the scope of this invention include sulphur-containing peroxyl or hydroperoxyl radical decomposers, including elemental sulphur and other compositions referred to previously and, in general from the following groups:

(a) Metal salts of dithiocarbamic acids, such as—zinc N-dibenzyl dithiocarbamate, tin N-dibenzyl dithiocarbamate, tin N-diethyl dithiocarbamate, zinc N-ethylphenyl dithiocarbamate, nickel dibutyl dithiocarbamate, zinc N-pentamethylene dithiocarbamate;

(b) Aliphatic and aromatic thiols, sulfides, sulfoxides, sulfones, sulfonic acids and sulfinic acids, the aliphatic substituents in each case comprising at least two units of at least eight carbons each and the aromatic substituents in each case comprising at least two units of at least six carbons each. Representative of this class of compounds are, 2-mercaptobenzothiazole, 4,4'-thiobis(6-tertbutyl-m-cresol), di-α-naphthyl sulfide, di-α-naphthyl sulfoxide, di-α-naphthyl sulfone, di-β-naphthyl sulfide, di-β-naphthyl sulfoxide, di-β-naphthyl sulfone, β', β'-distearyl thiodipropionate, β', β'-dilauryl thiodipropionate, α-naphthalene sulfonic acid, α-naphthalene sulfinic acid, β-naphthalene sulfonic acid, β-naphthalene sulfinic acid;

(c) Aliphatic and aromatic disulfides, the aliphatic substituents in each case comprising at least two units of at least eight carbons each and the aromatic substituents in each case comprising at least two units of at least six carbons each. Representative of this class of compounds are, 2,2'-dibenzothiazole disulfide, di-α-naphthyl disulfide, di-β-naphthyl disulfide, di-n-dodecyl disulfide, tetramethylthiuram disulfide;

(d) Aliphatic and aromatic thioesters and thioamides such as—1,3-diphenyl thiourea, 1-phenyl-3-methylthiourea, 1,3-diethylthiourea, 1,3-dicyclohexylthiourea, 5-methyl phenyl xanthate, 5-methyl cyclohexyl xanthate;

(e) Aliphatic and aromatic thiophosphite esters and thiophosphates such as tri(butylthio)-phosphite, tri(butylthio)phosphate, tri(phenylthio)phosphite, tri(phenylthio)phosphate; and (f) Aliphatic and aromatic phosphotrithionates and phosphotrithionites such as diethyl phenylphosphotrithionate, diphenyl phenylphosphotrithionate, diphenyl butylphosphotrithionate, ethyl diphenylphosphotrithionite, phenyl diphenylphosphotrithionite, phenyl dibutylphosphotrithionite.

Amoung this wide variety of possible peroxyl-reactive-sulphur-containing additive compounds, no specific preferred compound has been identified. However, certain general observations may be helpful in the choice of PRSC additives, and the amount thereof used in accordance with the present invention.

First, because the additive, to be effective, must remain dispersed throughout the polymeric composition as it is used, a relatively large molecule is desirable. For that reason, aliphatic and aromatic sulfides and disulfides are generally limited to compounds with aliphatic constituents in each case comprising at least two units of at least eight carbons each. Similarly, in the aromatic compounds, the aromatic is limited to such compounds comprising at least two units of at least six carbons each. It will be noted that one of the compounds found effective in the present invention is diphenyl sulfide. This is considered the lower limit in molecule size for compositions within the scope of the present invention.

A second point to be noted it that while, for purposes of assuring that the PRSC additive remains dispersed throughout the composition during use a relatively large molecule is desirable, the effectiveness of the additive is dependent on the mol ratio of the additive present. Yet, to avoid dilution of the composition, it is desired to keep the weight ratio of the additive relatively low. This suggest the use of relatively low molecular weight PRSC additive compounds. Just how these two conflicting objectives are met obviously will involve some compromise.

In general, only the relatively low molecular weight PRSC compounds, are effective toward the lower end of the weight concentration range for the PRSC additive compound within the scope of the present invention. Again, a spectrum of effectiveness relative to molecular size of the PRSC additive and its concentration in the polymeric composition, may be expected.

STATEMENT OF INDUSTRIAL APPLICATION

The stabilized polyalkylenecarbonate compositions of this invention are expected to be useful in applications which require prolonged exposure of the polymeric substrate to elevated temperatures in oxygen-containing environments. Potential situations in which the enhanced thermal stability of antioxidant-treated polyalkylene carbonates could be exploited include:

a. To facilitate in-package sterilization of, e.g., foods or surgical dressings and instruments packaged in polyalkylene carbonate films or laminates; to facilitate pasteurization of liquids in polyalkylene carbonate bottles.

b. To permit processing of polyalkylene carbonates over a wider temperature range than previously was possible. This would facilitate, e.g., the casting of films and molding of bottles directly from the molten polyalkylene carbonate.

c. To prolong the lifetime of products made from polyalkylene carbonates under ordinary use conditions (ambient temperature).

We claim:

1. A polyalkylene carbonate composition having improved thermal stability formed by reacting
   (a) a normally solid polycarbonate having substantially alternating epoxide and carbon dioxide units and a plurality of free hydroxyl groups represented by the formula:

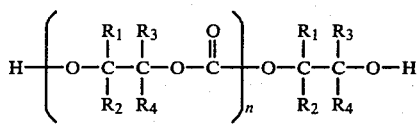

wherein:
$R_1$ is hydrogen, a halomethyl group, or a hydrocarbyl group having from 1 to 6 carbon atoms;
$R_3$ is hydrogen, a halomethyl group, or a hydrocarbyl group having from 1 to 6 carbon atoms;
$R_2$ and $R_4$ are hydrogen or a hydrocarbyl group having from 1 to 6 carbon atoms; or
$R_1$, $R_2$, $R_3$ and $R_4$ are combined together constituting a carbocyclic ring of from 4 to 7 carbon atoms and
n is the number of repeating units, which ranges from about 250 to 6,500, and end-capped modifications thereof with
(b) 0.2–10%, by weight (based on the weight of polycarbonate to be stabilized) of a sulphur-containing peroxyl radical-reactive compound from the group consisting of metal salts of dithiocarbamic acids; aliphatic and aromatic thiols, sulfides, sulfoxides, sulfones, sulfonic acids, and sulfinic acids; aliphatic and aromatic disulfides; aliphatic and aromatic thioesters and thioamides; aliphatic and aromatic thiophosphite esters and thiophosphonates; and aliphatic and aromatic phosphotrithionites and phosphotrithronates.

2. The polycarbonate of claim 1, wherein $R_2$ and $R_4$ are hydrogen atoms.

3. The composition of claim 2 wherein $R_1$ is selected from the group consisting of hydrogen and phenyl.

4. The polycarbonate of claim 3 wherein $R_3$ is selected from the group consisting of hydrogen and methyl groups.

5. The polycarbonate of claim 4 wherein n is about 500 to 1,500.

6. A composition as recited in any of claims 1–5, wherein said polycarbonate is reacted with 1–5% by weight, of said peroxyl-reactive compound.

7. A composition, as recited in claim 6, wherein said peroxyl-reactive compound is 3-t-butyl-4-hydroxy-5-methyl-phenol sulfide.

8. A composition, as recited in claim 6, wherein said peroxyl-reactive compound is diphenyl sulfide.

9. A composition, as recited in claim 6, wherein said peroxyl-reactive compound is diphenyl sulfoxide.

10. A composition, as recited in claim 6, wherein said peroxyl-reactive compound is diphenyl sulfone.

11. A composition, as recited in claim 6, wherein said peroxyl-reactive compound is di-(p-tolyl sulfide).

12. A composition, as recited in claim 6, wherein said peroxyl-reactive compound is sulphur.

13. A process for improving the thermal stability of normally solid polycarbonate and end-capped polycarbonate resins, said resins comprising a compound having substantially alternating epoxide and carbon dioxide units and a plurality of free hydroxyl groups represented by the formula:

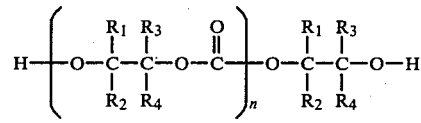

wherein:
$R_1$ is hydrogen, a halomethyl group, or a hydrocarbyl group having from 1 to 6 carbon atoms;
$R_3$ is hydrogen, a halomethyl group, or a hydrocarbyl group having from 1 to 6 carbon atoms;
$R_2$ and $R_4$ are hydrogen or a hydrocarbyl group having from 1 to 6 carbon atoms; or
$R_1$, $R_2$, $R_3$ and $R_4$ are combined together constituting a carbocyclic ring of from 4 to 7 carbon atoms and
n is the number of repeating units, which ranges from about 250 to 6,500, and
end-capped modifications thereof, said process comprising
(a) forming a solution of said resin,
(b) adding thereto 0.2–10%, by weight, (based on the weight of polycarbonate to be stabilized), of a sulphur-containing peroxide radical decomposer compound from the group consisting of metal salts of dithiocarbamic acids; aliphatic and aromatic thiols, sulfides, sulfoxides, sulfones, sulfonic acids, and sulfinic acids; aliphatic and aromatic disulfides; aliphatic and aromatic thioesters and thioamides; aliphatic and aromatic thiophosphite esters and thiophosphonates; and aliphatic and aromatic phosphotrithionites and phosphotrithionates, (c) removing solvent therefrom, and (d) subjecting and resultant resin and additive mixture to heat curing conditions.

14. A process, as recited in claim 13, wherein 1–5%, by weight, of diphenyl sulfide is added as said decomposer compound.

15. A process, as recited in claim 13, wherein 1–5%, by weight, of diphenyl sulfoxide is added as said decomposer compound.

16. A process, as recited in claim 13, wherein 1–5%, by weight, of diphenyl sulfone is added as said decomposer compound.

17. A process, as recited in claim 13, wherein 1–5%, by weight, of di-(p-tolyl sulfide) is added as said decomposer.

18. A process, as recited in claim 13, wherein 1–5%, by weight, of sulphur is added as said decomposer compound.

19. Process, as recited in any one of claims 14 to 18, wherein said heat curing conditions comprise subjecting said resultant mixture to a temperature of about 150° C. for about 15–20 minutes.

* * * * *